United States Patent [19]
Fittje

[11] Patent Number: 5,821,712
[45] Date of Patent: Oct. 13, 1998

[54] ELECTRO-MAGNETIC BRAKING SYSTEM

[76] Inventor: James E. Fittje, Box 8193, TTU, Cookeville, Tenn. 38505

[21] Appl. No.: 652,102

[22] Filed: May 23, 1996

[51] Int. Cl.⁶ ..................................................... H02P 3/14
[52] U.S. Cl. ........................... 318/376; 318/362; 310/93; 188/164; 188/159
[58] Field of Search ................................. 318/375, 382, 318/362, 139, 367, 381, 376, 757, 759, 760, 138; 188/159, 82.6, 82.2, 164, 161, 163, 162, 156, 82.3, 160; 310/36, 92, 105, 93

[56] References Cited

U.S. PATENT DOCUMENTS

| | | | |
|---|---|---|---|
| 4,223,255 | 9/1980 | Goldman et al. | 318/138 |
| 4,257,497 | 3/1981 | Schroeder | 188/82.6 |
| 4,788,463 | 11/1988 | Layh | 188/161 |
| 4,954,759 | 9/1990 | Fey | 318/375 |
| 5,054,587 | 10/1991 | Matsui et al. | 188/267 |
| 5,185,542 | 2/1993 | Lazorchak | 310/36 |
| 5,275,261 | 1/1994 | Vranish | 188/82.2 |
| 5,282,641 | 2/1994 | McLaughlin | 180/165 |
| 5,363,937 | 11/1994 | James | 180/192 |
| 5,485,901 | 1/1996 | Akima et al. | 188/164 |
| 5,577,578 | 11/1996 | Lazorchak | 188/171 |

*Primary Examiner*—John W. Cabeca

[57] ABSTRACT

A braking system consisting of coil assemblies (6) which move in relation to a rotor magnet assembly (9) by using an actuator assembly (2). As the coil assemblies (6) are moved closer to the rotor magnet assembly (9), a current will develop in the coil assembly (6) which will generate a magnet field. This magnet field will in turn induce a torque on the rotor magnet assembly (9). The developed current can then be used to recharge the onboard energy storage system.

1 Claim, 2 Drawing Sheets

View A-A

View B-B

ELECTRO-MAGNETIC BRAKING SYSTEM

BACKGROUND-FIELD OF INVENTION

This invention relates to variable geometry electric generators, specifically to such generators that are used as the part of a braking system for electric vehicles.

BACKGROUND-DESCRIPTION OF PRIOR ART

Most vehicles come equipped with a braking system that is either of disk or drum design. Many of the new designs, such as anti-lock brakes, are simply modifications of the above mentioned basic designs. All of the current braking systems convert the kinetic energy of the vehicle to heat by means of friction. The heat generated by the brake pads exerting a frictional force on a rotor assembly readily escapes into the environment. Thus, the kinetic energy of the vehicle is effectively wasted during a braking maneuver, since there is currently no means by which to recover this energy which escapes as heat. All braking systems based on the disk type of design are known to suffer a loss of braking capability during bad weather due to water collecting on the rotor or pad assemblies. This causes a dangerous situation when it is raining and the roads are wet, because visibility is reduced. This coupled with the potential for a temporary loss in braking capability, causes thousands accidental deaths each year.

These systems are very wasteful for electric vehicles. This class of vehicles can carry a very limited amount of energy and has rather long recharge times (as of this writing). During a braking maneuver with conventional brakes, this energy escapes as heat into the environment and severely limits the range of the vehicle. This is because the electrical energy used to move the vehicle from a stop to a certain velocity is lost when the vehicle returns to zero velocity. This situation is aggravated in an urban "stop-and-go" environment where there are many stop signs and stop lights per mile (km) traveled. The present invention describes a braking system in which the kinetic energy of the vehicle is transferred through the transmission to an electrical generator that has a variable distance between the stator and rotor assemblies, thus converting a large portion of the vehicles kinetic energy to electrical energy. But, nevertheless, all the braking systems used on vehicles previously are known to suffer from a number of disadvantages:

(a) The brake pads and rotor assemblies used require costly maintenance on a fairly regular basis.

(b) They are extremely wasteful methods of converting the kinetic energy of a vehicle to a more useful form of energy such as electricity, angular momentum in a disk, or some other form.

(c) They can become ineffective during certain types of road conditions. Water can get between the rotor and pad assemblies, thus causing a short term loss of braking capability and causing thousands of accidental deaths each year.

(d) They do not utilize of the mechanical advantage capability of the transmission system.

OBJECTS AND ADVANTAGES

The proposed invention has several objects and advantages. These are:

(a) to provide a braking system that has no brake pads, disks, or drums that require regular costly maintenance;

(b) to provide a very efficient method of converting the kinetic energy of the vehicle to electricity, which is a much more useful form of energy than the waste heat of conventional braking systems;

(c) to provide a braking system that is equally effective regardless of water collection on the wheels or other components; and (d) to provide a braking system that will utilize the mechanical advantage of a transmission system.

Further objects and advantages are to provide a braking system that is completely encased and not exposed to the elements, works equally well in hot, cold, wet, or dry climates, most of the components are simple to construct or are assemblies consisting of off the shelf components, can easily be used on current vehicles with minor modifications, is capable of stopping a vehicle in an acceptable distance, and can be used in conjunction with any other braking system. Still further objects and advantages will become apparent from a consideration of the ensuing description and drawings.

DRAWING FIGURES

Figure 1:
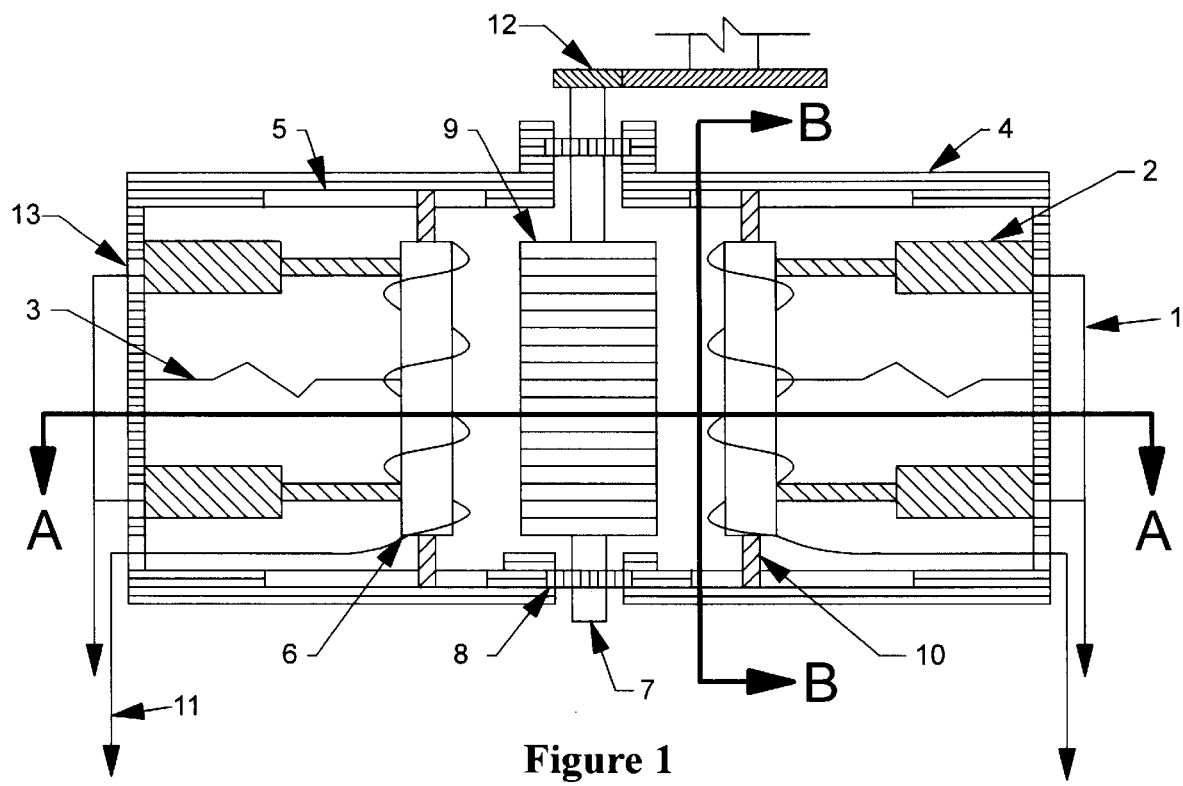
FIG. 1 shows the top view of the braking system with all the primary components.

| Reference Numerals In Drawings | |
|---|---|
| 1 brake fluid line | 8 support bearings |
| 2 actuator assembly | 9 rotor magnet assembly |
| 3 return spring | 10 coil guide bar |
| 4 assembly housing | 11 electrical output wiring |
| 5 coil guide track | 12 gear |
| 6 coil assembly | 13 casing orifice |
| 7 rotor shaft | 14 ball bearings |

DESCRIPTION OF FIGS. 1–4

Figure 2:
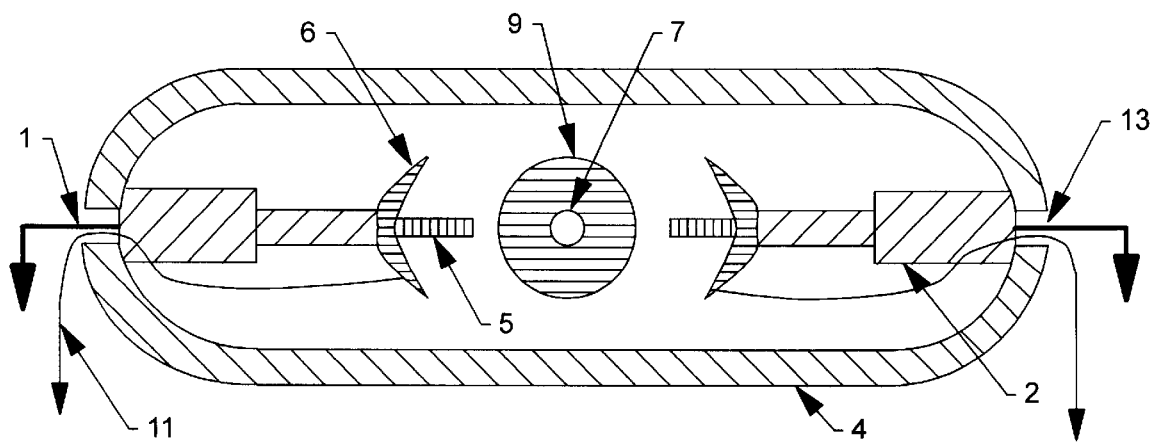
FIG. 2 shows cross-sectional view A—A, which is referred to in FIG. 1.

A typical arrangement of the present invention is shown in FIG. 1 (top view) and FIG. 2 (end view). The system consists of a gear 12 which connects the system to the vehicle's transmission. The rotor shaft 7 is connected to this gear 12, and is supported by two bearings 8. One bearing is placed at each end of the shaft 7. Attached to this shaft 7 is a magnet assembly 9. This assembly consists of permanent magnets orientated so that the north and south poles of these magnets are placed at the circumference of the assembly, in the preferred embodiment. The assembly housing 4 contains the entire system and has a coil guide track 5 machined into its wall. The four actuator assemblies 2 are attached to the assembly housing 4 and the coil assemblies 6. These actuator assemblies are driven by a brake fluid line 1 and are a typical piston-cylinder type of design in the preferred embodiment. The brake fluid line 1 enters the assembly housing 4 by means of a casing orifice 13. The coil assemblies 6 are attached to the actuator assemblies 2 and are guided by the coil guide bars 10, which are set into the coil guide track in the preferred embodiment. The coil assemblies 6 are returned to their initial position away from the rotor magnet assembly 9 by means of the return spring 3. The electrical output of the coil assemblies 6 is transferred out of the assembly housing 4 by means of the electrical output wiring 11 which passes through a casing orifice 13 in the preferred embodiment.

In FIG. 2, view A—A is shown. This view shows the end of the rotor shaft 7 and rotor magnet assembly 9. The coil assemblies 6 are shown connected to the actuator assembly 2. The electrical output wiring 11 and brake fluid line 1 are shown leaving the same casing orifice 13. This is because the hidden lines were omitted for clarity. The coil guide track 5 is shown in relation to the coil assemblies 6 and rotor magnet assembly 9.

Figure 3:
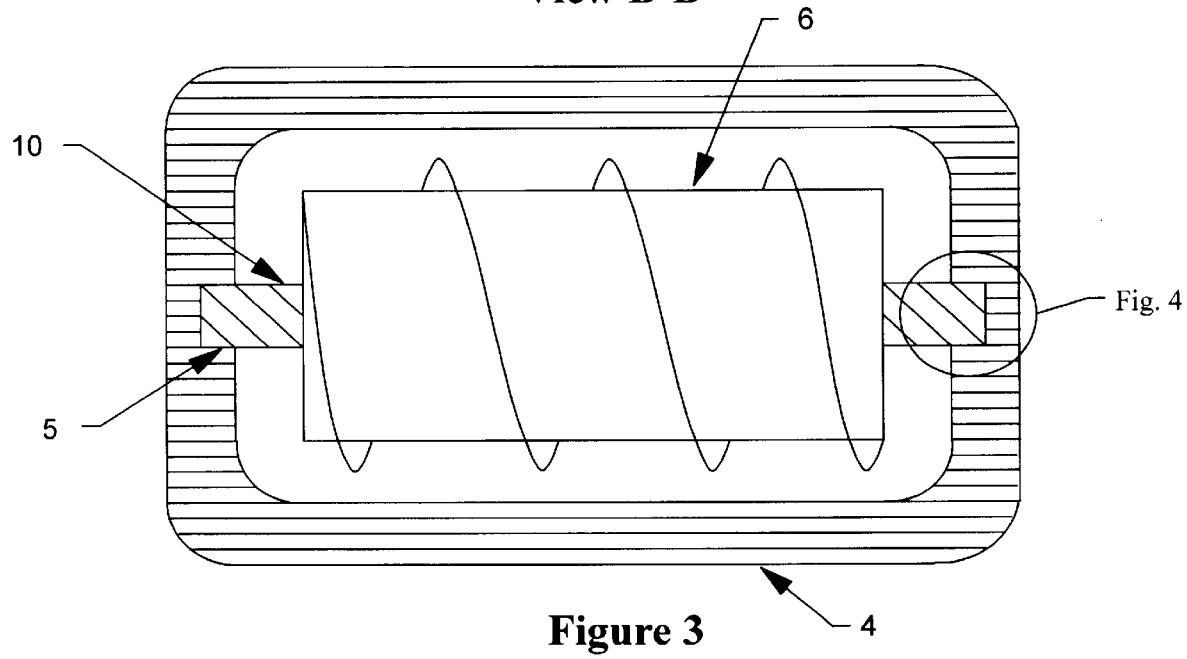
FIG. 3 shows cross-sectional view B—B that is referred to in FIG. 1.
Figure 4:
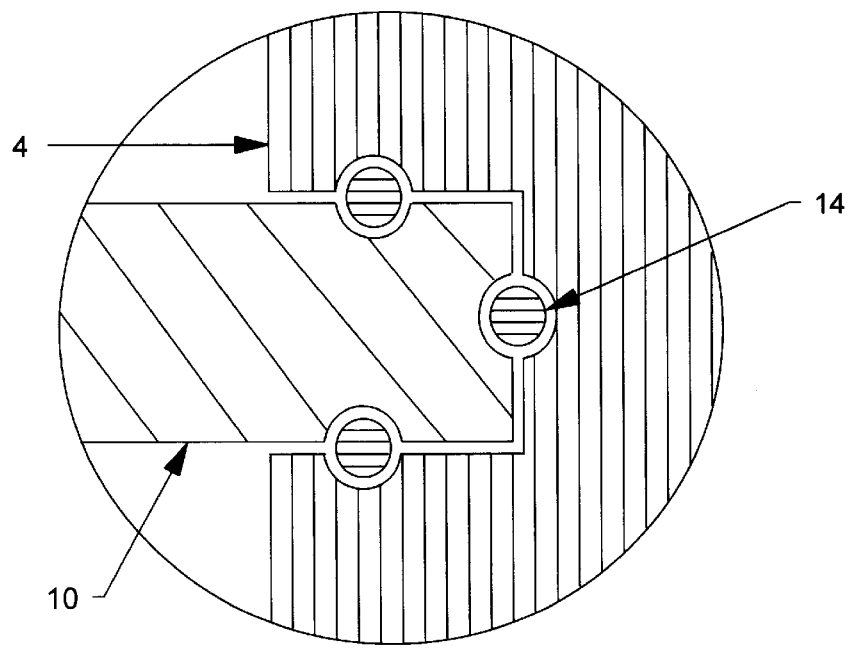
FIG. 4 shows the enlarged bearing assembly labeled in FIG. 3.

FIG. 3 is view B—B as is shown in FIG. 1. This figure shows the assembly housing 4 and coil assembly 6. The coil guide bar 10 and coil guide track 5 are shown both in FIG. 3 and in FIG. 4. FIG. 4 shows the coil guide bar 10 and the assembly housing 4 separated by the ball bearings 14 in the preferred embodiment. The ball bearings 14 are exaggerated in FIG. 4 and omitted from FIGS. 1–3 for clarity.

OPERATION-FIGS. 1,2,3,4

The manner of using the electromagnetic braking system begins by attaching the assembly housing 4 to the vehicle. The gear 12 would be attached to the vehicle's transmission or other coupling mechanism to the vehicles' wheels. Therefore, as the vehicle's wheels turn so would the rotor magnet assembly 9. When the brakes are applied, the actuator assemblies 2 would move the coil assemblies 6 closer to the rotor magnet assembly 9. As the actuator assemblies 2 move the coil assemblies 6 the coil guide bar 10 will support the coil assemblies 6 by gliding on the ball bearings 14 located in the coil guide track 5. The rotating magnet field near the rotor magnet assembly 9 will cause a current to flow in the coil assemblies 6. As the coil assemblies 6 move closer to the rotor magnet assembly 9, the induced current will increase. This induced current will, in turn, generate an electro-magnetic field that will exert a force, and thus a torque on the rotor magnet assembly 9. This torque will, in turn, be transferred through the coupling mechanism and will slow the rotation of the wheels, thus slowing the vehicle.

Once the brakes are disengaged, the return spring 3 will move the coil assembly 6 away from the rotor magnet assembly 9 and relieve the torque on this assembly, thus returning the entire assembly to its original position. The electrical current induced in the coil assembly 6 will leave the device by means of the electrical output wiring 11 which passes through a casing orifice 13. This electrical output can then be conditioned and sent to a battery or any other energy storage device. Therefore, the majority of the kinetic energy of the vehicle is converted into electrical energy by means of inducing a current in the coil assemblies 6. The position of these coils, and thus, the torque slowing the vehicle is controlled by the vehicle operator as with a conventional braking system.

SUMMARY, RAMIFICATIONS, AND SCOPE

Accordingly, the reader will see that the electromagnetic braking system of this invention can be used on any vehicle currently in production or on any future vehicle with minor modifications to the transmission and electrical systems. This system is capable of providing a torque on the transmission that is transferred to the wheels. By using the mechanical advantage in the transmission or other gearbox, and possibly an additional gear box to increase the rotational speed of the braking shaft, the torque slowing acting on the vehicle's wheels can be multiplied. Once the stator assemblies have reached their maximum closeness to the braking shaft and rotor assembly, the conventional braking system will engage to assist in stopping the vehicle. This feature is of particular importance during emergency braking and bad road conditions where both systems will be working simultaneously to slow and stop the vehicle.

Because this system effects the transmission, it slows all the wheels which receive power from the transmission during its operation. The kinetic energy of the vehicle is, in turn, converted to electrical energy and can be sent to an on board energy storage device (battery pack, capacitor bank, etc.). This is an extra advantage to electric vehicles. By using this system, a very large percentage of the energy spent in increasing the vehicles kinetic energy (increasing its speed), can be recovered when it slows down and is sent back to the onboard energy storage system for later use. This will greatly increase the electrical vehicle's range, endurance, and efficiency. This particular configuration of this invention has no brushes, as in many electrical generator designs, and thus, they will never need to be replaced. This will lower maintenance costs and increase durability.

Although the description above contains many specificity's, these should not be construed as limiting the scope of the invention, but as merely providing illustrations of some of the presently preferred embodiments of this invention. For example, there are an infinite number of possible gear ratios by which the braking shaft could be connected to the transmission or wheels; the braking shaft and other rotating components could be of any material or shape (circular, square, triangular, etc.); the outer casing and mounting brackets could have many different shapes and configurations depending on the particular vehicle and mounting position; the coils could consist of any type of metal wire of any gauge wound in any configuration of any number of turns; the bearings could be in various positions and of varying number depending on the particular configuration; the magnets in the rotor assembly could be different in number, orientation, composition (rare earth, permanent, etc.), and location (stator or rotor); any diameter, length, geometric distance, shape, cross section, or material can be changed and still have the same general capabilities of the invention.

There may be a different number of actuator assemblies 2 and they may be electromagnetic or hydraulic, which is shown in FIGS. 1–4, and work off of existing braking systems. There may be a different number of return springs 3 and they may be in different positions.

Thus the scope of this invention should be determined by the appended claims and their legal equivalents, rather than by the examples given.

I claim:

1. An energy transfer system for an electromagnetic braking system comprising:
    (a) at least one rotatable assembly coupled to and rotated by a shaft, said rotatable assembly comprising permanent magnets mounted thereon;
    (b) at least one static assembly disposed a distance from said rotatable assembly, said static assembly further comprising coil means for conduction of induced electrical energy;

(c) an actuator means for varying the distance between the rotatable assembly and said static assembly, said actuator means actuated in response to a command to engage the braking system;

(d) said coil means generating the induced electrical energy when said actuator means is actuated to a position said static assembly at a distance proximally close to said rotatable assembly without directly physically contacting said rotatable assembly, said induced electrical energy exerting a torque on said rotatable assembly so as to slow the rotation of the shaft, said torque increasing in inverse proportion to the distance between said rotatable assembly and said static assembly thereby varying the quantity of induced current and the corresponding torque on the rotatable assembly; and (e) transferring means for transferring the electrical energy from the generating means to an energy storage device.

* * * * *